US007603820B1

(12) United States Patent
Lai

(10) Patent No.: US 7,603,820 B1
(45) Date of Patent: Oct. 20, 2009

(54) GLASS PANE CONNECTOR

(75) Inventor: Chun Hung Lai, Taichung County (TW)

(73) Assignee: Taiwan Dali Aurora Enterprise Co., Ltd., Dali, Taichung County (TW)

( * ) Notice: Subject to any disclaimer, the term of this patent is extended or adjusted under 35 U.S.C. 154(b) by 0 days.

(21) Appl. No.: 12/283,248

(22) Filed: Sep. 10, 2008

(51) Int. Cl.
*E04H 1/00* (2006.01)
*F16C 11/06* (2006.01)

(52) U.S. Cl. .............................. 52/235; 403/56; 403/90

(58) Field of Classification Search ................... 403/56, 403/76, 90, 114, 115, 122–144; 52/235
See application file for complete search history.

(56) References Cited

U.S. PATENT DOCUMENTS 1,410,004 A * 3/1922 Dodds ........................ 411/379
4,689,928 A * 9/1987 Dutton et al. ................. 52/235
5,540,514 A * 7/1996 Demars et al. ................ 52/235
5,921,698 A * 7/1999 Hegen et al. ................ 403/260
6,430,894 B1 * 8/2002 Chae et al. ..................... 52/235
6,442,911 B2 * 9/2002 Elmer et al. .................. 52/235
2008/0163579 A1 * 7/2008 Kreyenborg et al. .......... 52/474

FOREIGN PATENT DOCUMENTS

DE 4342097 A1 * 6/1995
WO WO 9516099 A1 * 6/1995

* cited by examiner

*Primary Examiner*—Victor MacArthur
(74) *Attorney, Agent, or Firm*—Charles E. Baxley

(57) ABSTRACT

A glass pane connector comprises a pane holding assembly, a positioning assembly, a supporting assembly connecting the pane holding assembly and the positioning assembly, and at least one pivot assembly serving to changing an angle where the supporting assembly connects the pane holding assembly and the positioning assembly. The glass pane connector serves to position a glass pane at a predetermined installation site or to connect glass panes into a glass curtain wall.

4 Claims, 6 Drawing Sheets

GLASS PANE CONNECTOR

BACKGROUND OF THE INVENTION

1. Technical Field

The present invention relates to glass construction technologies, and more particularly, to a glass pane connector that serves to position a glass pane with respect to another glass pane or a predetermined site of a building.

2. Description of Related Art

In glass construction technologies, glass pane connectors are usually used to position a glass pane at a predetermined installation site on a building or to construct several glass panes into a glass curtain wall. In such application, holes have to be bored on the substantial structure of the installation site and the glass panes so that plural glass pane connectors can connect and hold the glass panes in position with respect to the installation site.

However, one difficulty of the conventional approach is to ensure the holds bored on the installation site and the glass panes well aligned. In the event that the holes are not properly arranged, such malposition would often not be found until some glass panes have been assembled by the connectors. To remedy the problem, the glass panes have to be disassembled and re-drilled, thereby spending additional time and energy. Besides, in reassembling the glass panes, it is impossible to use the connectors to fix peripheral areas of the previously mis-drilled holes, thereby causing the reassembly of the glass panes unfirm.

Moreover, when surface of the installation site is not even or when the mechanical strength the glass pane connectors apply to the glass panes is not uniform, surface of the assembled glass panes tend to be uneven. Consequently, the assembled glass panes have to be adjusted piece by piece, thus causing additional time and energy costs.

SUMMARY OF THE INVENTION

One object of the present invention is to provide a glass pane connector that serves to position a glass pane at a predetermined installation site or to connect glass panes into a glass curtain wall.

Another object of the present invention is to provide a glass pane connector that features automatic angle adjustment, wherein the glass pane connector is capable of automatically changing its angle according to holes formed on a predetermined installation site and glass panes so that when the holes are not well aligned, the glass pane connector can still firmly hold the glass panes with the installation site.

Another object of the present invention is to provide a glass pane connector that features automatic angle adjustment, wherein plural said glass pane connectors can such position a glass pane at a predetermined installation or such connect plural glass panes as a glass curtain wall that surface of the assembled glass panes remains even.

To achieve these and other objectives of the present invention, the glass pane connector of the present invention comprises:

a pane holding assembly, for piercing through and being fixed in a hole formed on a glass pane;

a positioning assembly, for being fastened to an installation site where the glass pane is to be assembled;

a supporting assembly, having one end connected with the pane holding assembly and another end connected with the positioning assembly, and at least one pivot assembly, allowing the supporting assembly to change included angles between the supporting assembly and the pane holding assembly and between the supporting assembly and the positioning assembly.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENTS

Figure 1:
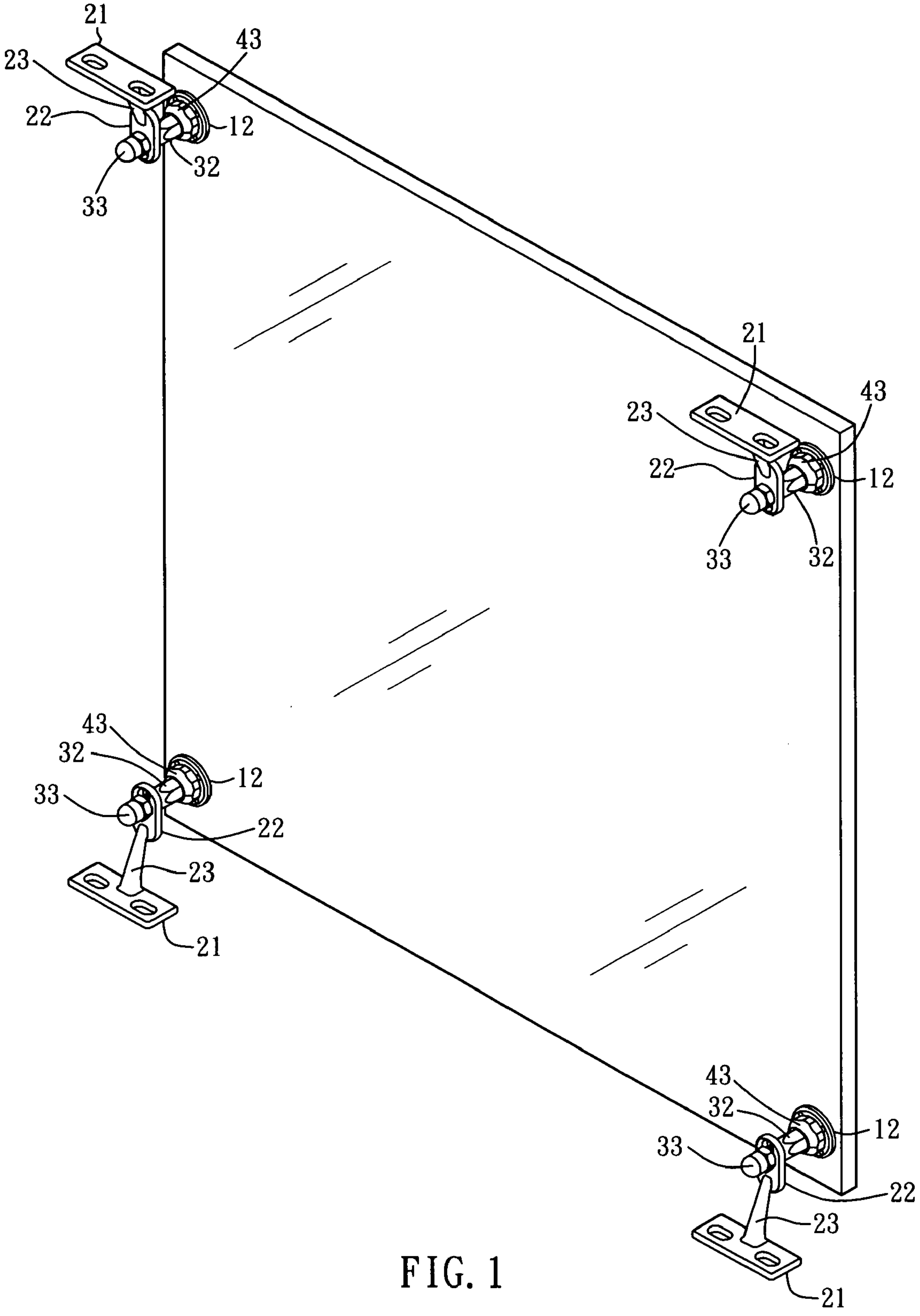
FIG. 1 is an applied drawing showing glass pane connectors of the present invention assembled to a glass pane.
Figure 2:
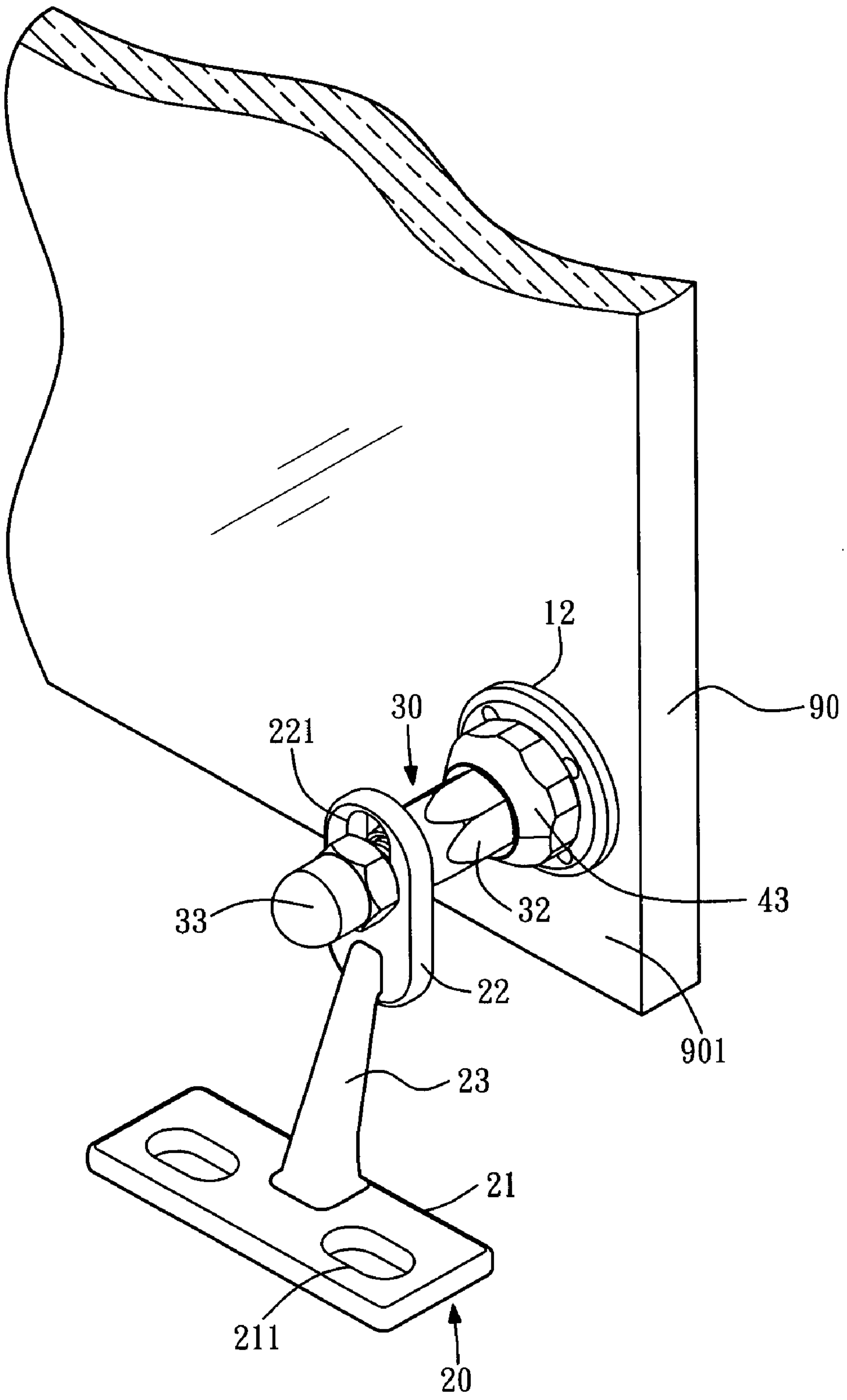
FIG. 2 is a partially enlarged drawing of FIG. 1.
Figure 3:
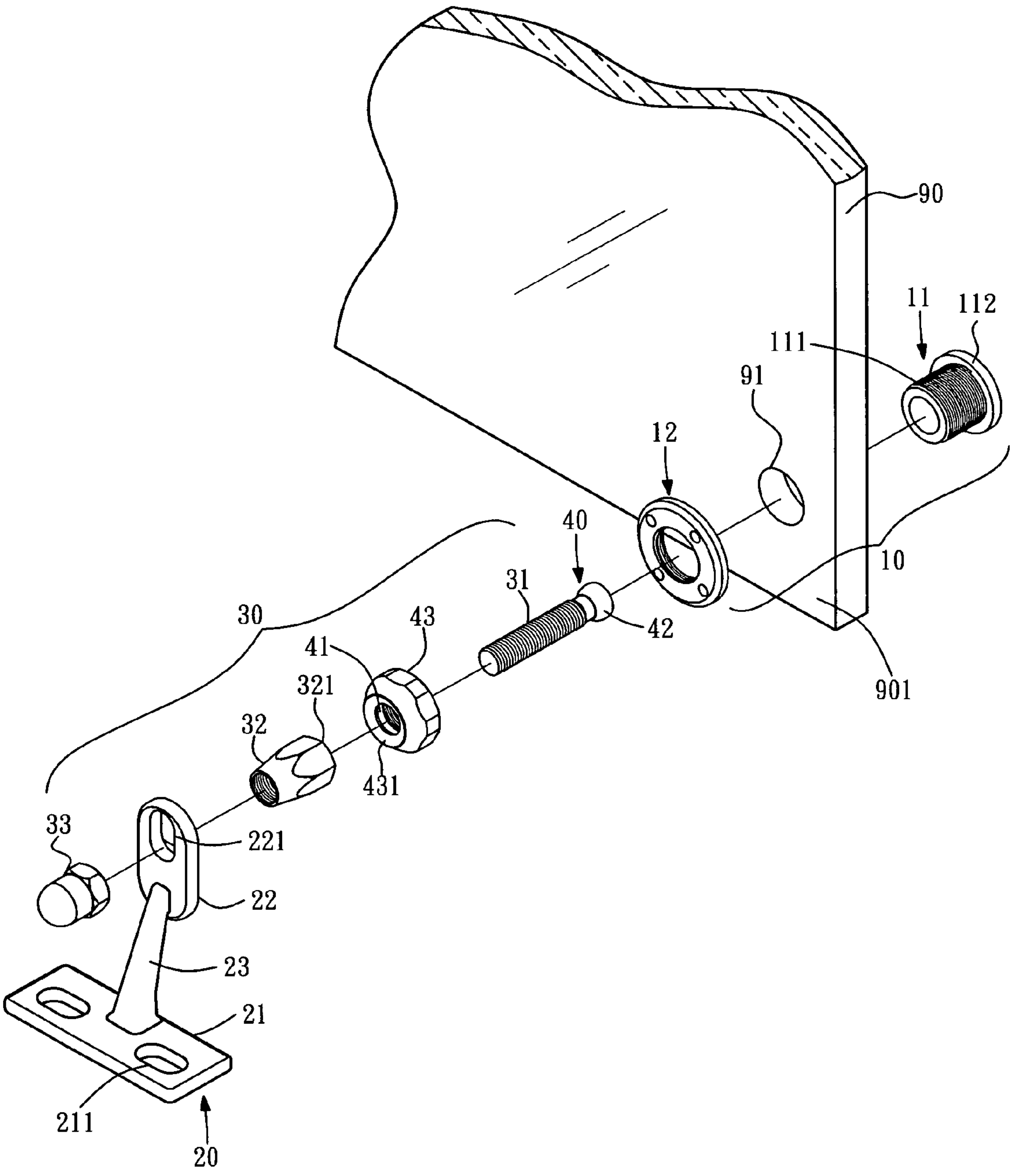
FIG. 3 is an exploded view of the glass pane connector and the glass pane.

While a preferred embodiment is provided herein for illustrating the concept of the present invention as described above, it is to be understood that the components in these drawings are made for better explanation and need not to be made in scale. Moreover, in the following description, resemble components are indicated by the same numerals.

Please refer to FIGS. 1 through 4 for glass pane connectors proposed by the present invention. Each said lass pane connector comprises a pane holding assembly 10, a positioning assembly 20, a supporting assembly 30, and at least one pivot assembly 40.

The pane holding assembly 10 pierces through and is fixed in a hole 91 formed on a glass pane 90.

The positioning assembly 20 is fastened to an installation site. The installation site includes, but is not limited to, a substantial structure 92 of a building where the glass pane 90 is to be assembled.

The supporting assembly 30 has one end connected with the pane holding assembly 10 and another end connected with the positioning assembly 20.

The pivot assembly 40 has a spherical receiving portion 41 and a spherical prominence 42. The spherical receiving portion 41 and the spherical prominence 42 may be provided on the supporting assembly 30 and the pane holding assembly 10, respectively for facing and combining with each other. Alternatively, the spherical receiving portion 41 and the spherical prominence 42 may be provided on the supporting assembly 30 and the positioning assembly 20, respectively for facing and combining with each other. The pivot assembly 40 enables the supporting assembly 30 to rotate in all directions so as to change included angles between the supporting assembly 30 and the pane holding assembly 10 and between the supporting assembly 30 and the positioning assembly 20.

More particularly, the pane holding assembly 10 comprises a piercing portion 11 and a fastening ring 12. The piercing portion 11 has a tubular piercing segment 111 and a retaining segment 112 integrally formed at one end of the piercing segment 111. The piercing segment 111 passes through the hole 91 formed on the glass pane 90 and then combined with the fastening ring 12 by means of threads so that the retaining segment 112 and the fastening ring 12 contact surfaces 901 of the glass pane 90 and thereby jointly sandwich the glass pane 90. When the fastening ring 12 is further screwed to the piercing segment 111, a mechanical strength the retaining segment 112 and the fastening ring 12 applying to the glass pane 90 can be enhanced so as to combine the pane holding assembly 10 and the glass pane 90 with improved firmness. In the same reason, the pane holding assembly 10 is enabled to hold glass panes with different thickness.

To describe the supporting assembly 30 in detail, it comprises a supporting shaft 31 and a first positioning sleeve 32 as well as a second positioning sleeve 33 that combine with an outer surface of the supporting shaft 31 by means of threads.

As to the detailed structure of the pivot assembly 40, the spherical prominence 42 is formed at an end of the supporting shaft 31 and the spherical receiving portion 41 is formed inside an annular seat 43, wherein the annular seat 43 is combined with an end of the piercing portion 11 by means of threads. By the spherical connection between the spherical prominence 42 and the spherical receiving portion 41, the supporting shaft 31 is allowed to rotate in all directions. Furthermore, contacting surfaces between the annular seat 43 and the first positioning sleeve 32 may be formed as an arched receiving concave 431 and an arched convex 321, respectively, so that when the first positioning sleeve 32 is further screwed into the supporting shaft 31, the arched receiving concave 431 and the arched convex 321 abut against each other, thereby achieving close and firm combination.

Referring to the positioning assembly 20, it includes a fastening portion 21, a shaft connecting portion 22 and an arm 23 connecting the fastening portion 21 and the shaft connecting portion 22. There are plural holes 211 formed on the fastening portion 21 for allowing a plurality of fasteners passing therethrough so as to fix the fastening portion 21 to the aforesaid substantial structure 92. The shaft connecting portion 22 comprises a slot 221 for allowing an end of the supporting shaft 31 passing therethrough. The shaft connecting portion 22 is sandwiched by the first positioning sleeve 32 and the second positioning sleeve 33 so that when the second positioning sleeve 33 is further screwed into the supporting shaft 31, a mechanical strength the first positioning sleeve 32 and the second positioning sleeve 33 applying to the shaft connecting portion 22 is enhanced so as to combine the shaft connecting portion 22 and the supporting assembly 30 with improved firmness. In the same reason, the supporting assembly 30 is enabled to hold shaft connecting portions 22 with different thickness.

Figure 4:
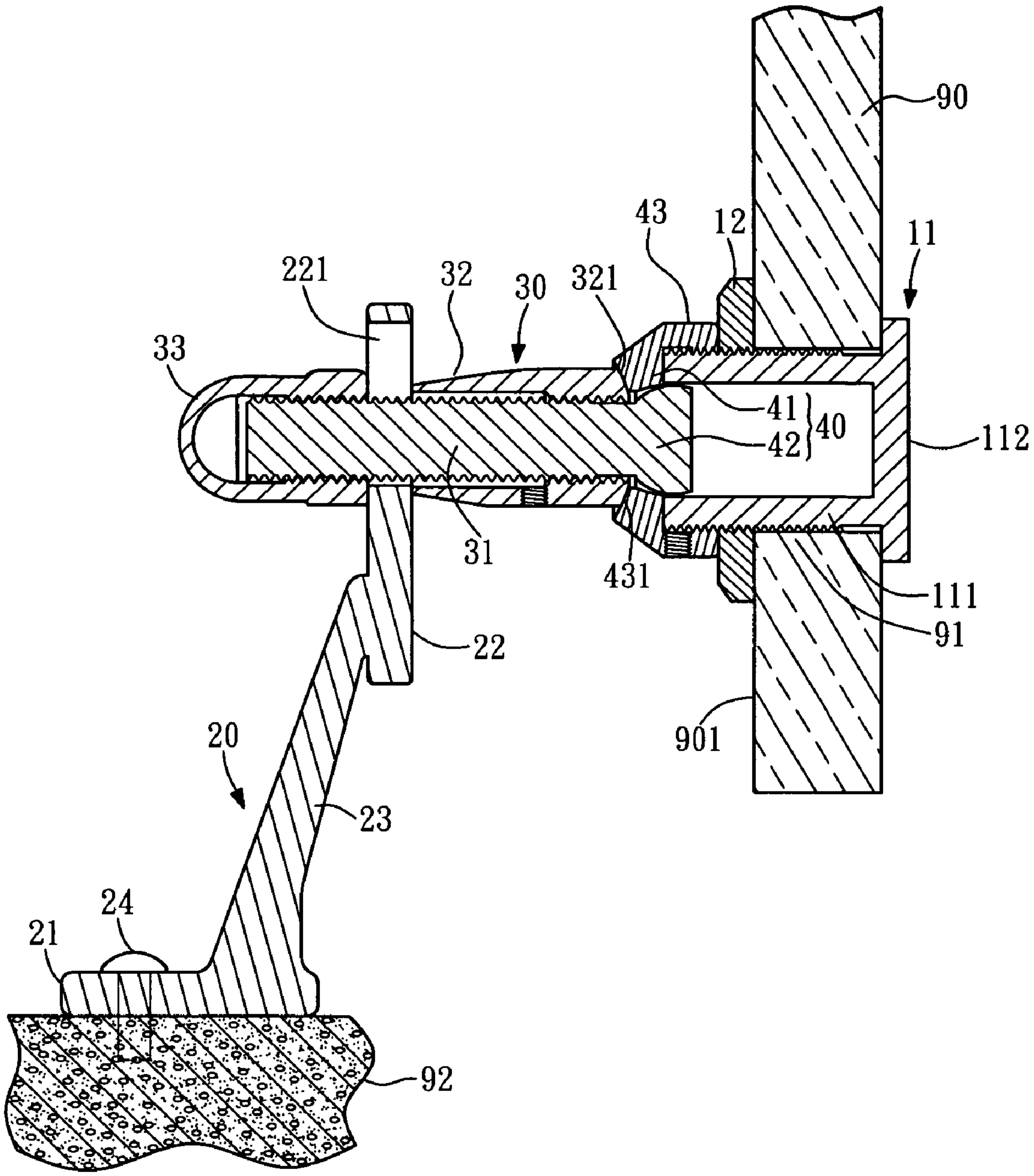
FIG. 4 is a cross-sectional view of the glass pane connector that connects the glass pane with an installation site.
Figure 5:
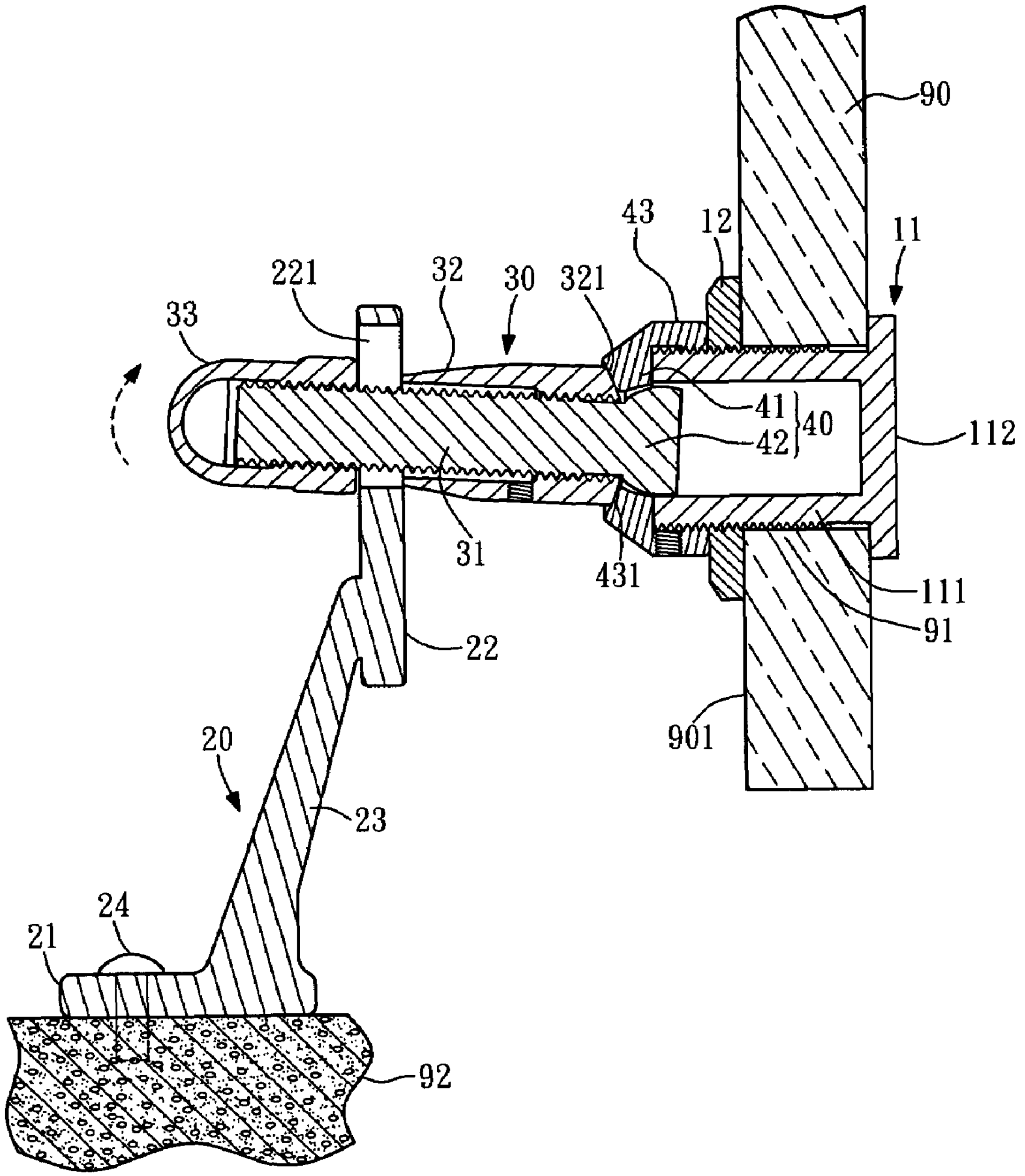
FIG. 5 is another cross-sectional view of the glass pane connector that connects the glass pane with the installation site.

Reference is now made to FIGS. 4 and 5, the pivot assembly 40 enables the supporting assembly 30 to rotation in all directions so as to change included angles between the supporting assembly 30 and the pane holding assembly 10 and between the supporting assembly 30 and the positioning assembly 20. Thereby, the disclosed glass pane connector features automatic angle adjustment. Even when holes made on the glass pane 90 and the substantial structure 92 where the glass pane 90 is to be assembled are not well aligned, the disclosed glass pane connector can also function effectively and ensure firm position of the glass pane 90. The glass pane connectors depicted in FIGS. 1 to 5 are implemented to position a single glass pane.

Figure 6:
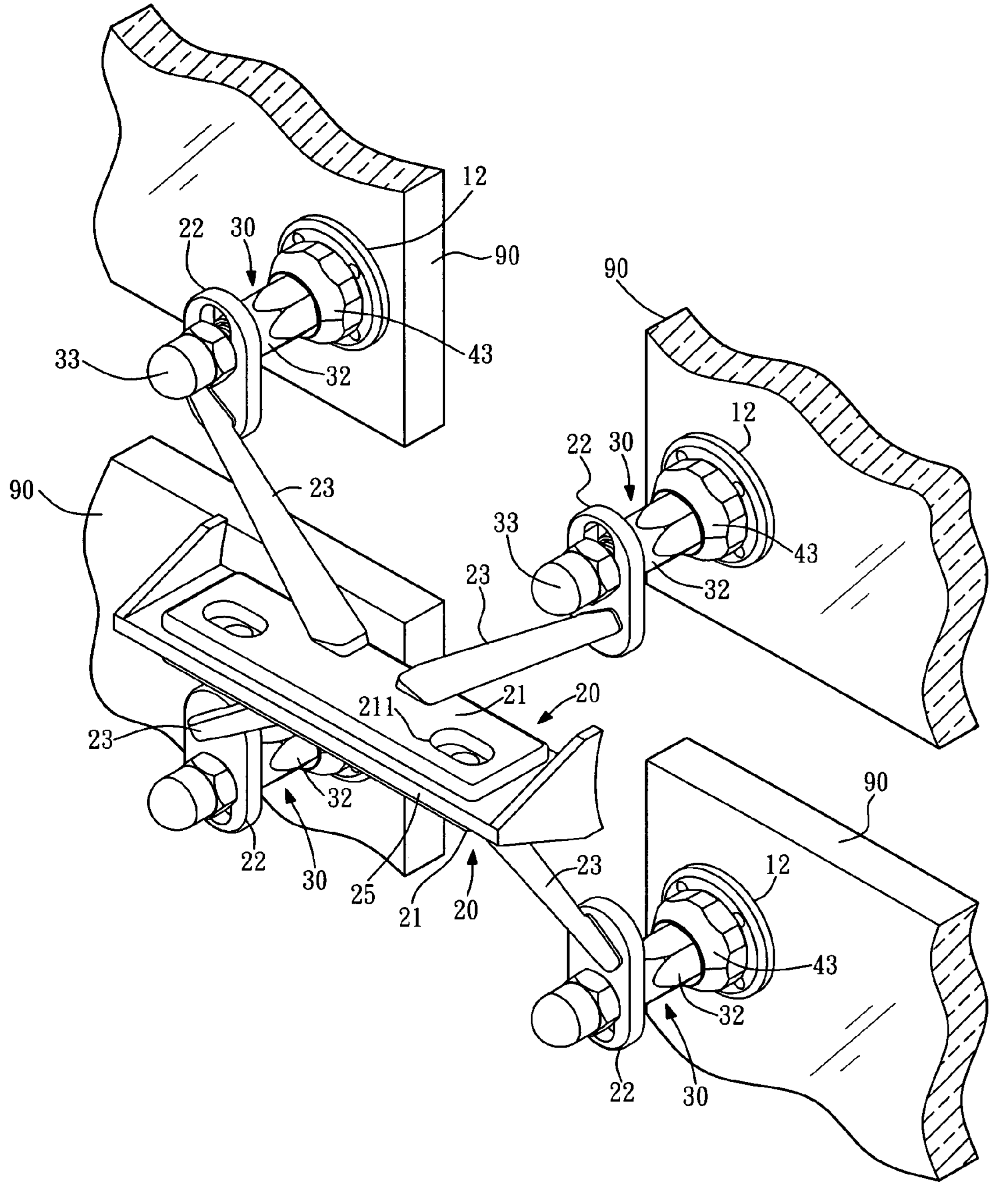
FIG. 6 is an applied drawing showing the glass pane connectors connect plural glass panes.

In FIG. 6, an alternative positioning assembly 20 includes a fastening portion 21, two shaft connecting portion 22 and two arm 23 connecting the fastening portion 21 and the shaft connecting portions 22. Two of such positioning assemblies 20 are such placed that the fastening portions 21 thereof are vertically connected. Some screws pass the holes 211 on the fastening portions 21 to combine the positioning assemblies 20. Plural glass panes 90 have the pane holding assemblies 10 and supporting assemblies 30 assembled with the shaft connecting portions 22, respectively, so that the glass panes 90 are assembled side by side into a glass curtain wall. Since the glass pane connectors function with automatic angle adjustment, they can construct the glass panes 90 in a coplanar manner. According to FIG. 6, a pad 25 is provided between two said fastening portions 21. By using pads with difference thickness, a distance between two adjacent said fastening portions 21 can be changed so that a distance between two adjacent said glass panes 90 can be in turn adjusted.

Although the particular embodiment of the invention has been described in detail for purposes of illustration, it will be understood by one of ordinary skill in the art that numerous variations will be possible to the disclosed embodiment without going outside the scope of the invention as disclosed in the claims.

What is claimed is:

1. A glass pane connector for supporting a glass pane at a selected angle relative to a structure, said glass pane connector comprising:

- a glass pane holding assembly having a cylindrical piercing portion and a fastening ring, said piercing portion having an externally threaded end adapted to be conformingly inserted through a hole in the glass pane and threaded into an internal thread of said fastening ring to thereby clamp the glass pane between said fastening ring and an annular retaining segment formed on said piercing portion;
- a supporting assembly having a pivot assembly, an annular seat, a first positioning sleeve, and a second positioning sleeve;
- a positioning assembly having an arm extending between a shaft connecting portion and a fastening portion adapted to mount to the structure, said shaft connecting portion having an elongate slot;
- said pivot assembly having a spherical prominence formed at a first end of a threaded shaft, a second end of the threaded shaft extending through the elongate slot,
- said annular seat having first and second oppositely facing concave portions, said first concave portion conformingly receiving said prominence,
- said first positioning sleeve having an arched convex end conformingly received in said second concave portion, an internal thread of said first positioning sleeve screwed onto said threaded shaft to clamp said annular seat between said prominence and said convex end,
- said second positioning sleeve having an internal thread screwed onto a second end of said threaded shaft to clamp said positioning assembly between said first positioning sleeve and said second positioning sleeve; and
- whereby the screwing of said first positioning sleeve on said threaded shaft locks the pane holding assembly from pivoting relative to the supporting assembly, and whereby the screwing of the second positioning sleeve on said threaded shaft locks the supporting assembly from pivoting relative to the positioning assembly.

2. The glass pane connector as claimed in claim 1, wherein said positioning assembly has an additional shaft connecting portion and an additional arm connecting said additional shaft connecting portion to said fastening portion.

3. The glass pane connector as claimed in claim 2, wherein said fastening portion comprises a plurality of apertures.

4. The glass pane connector as claimed in claim 3, further comprising: an additional positioning assembly having an additional fastening portion, and

- a pad operatively connected between said fastening portion and said additional fastening portion.

* * * * *